United States Patent Office 2,711,549
Patented June 28, 1955

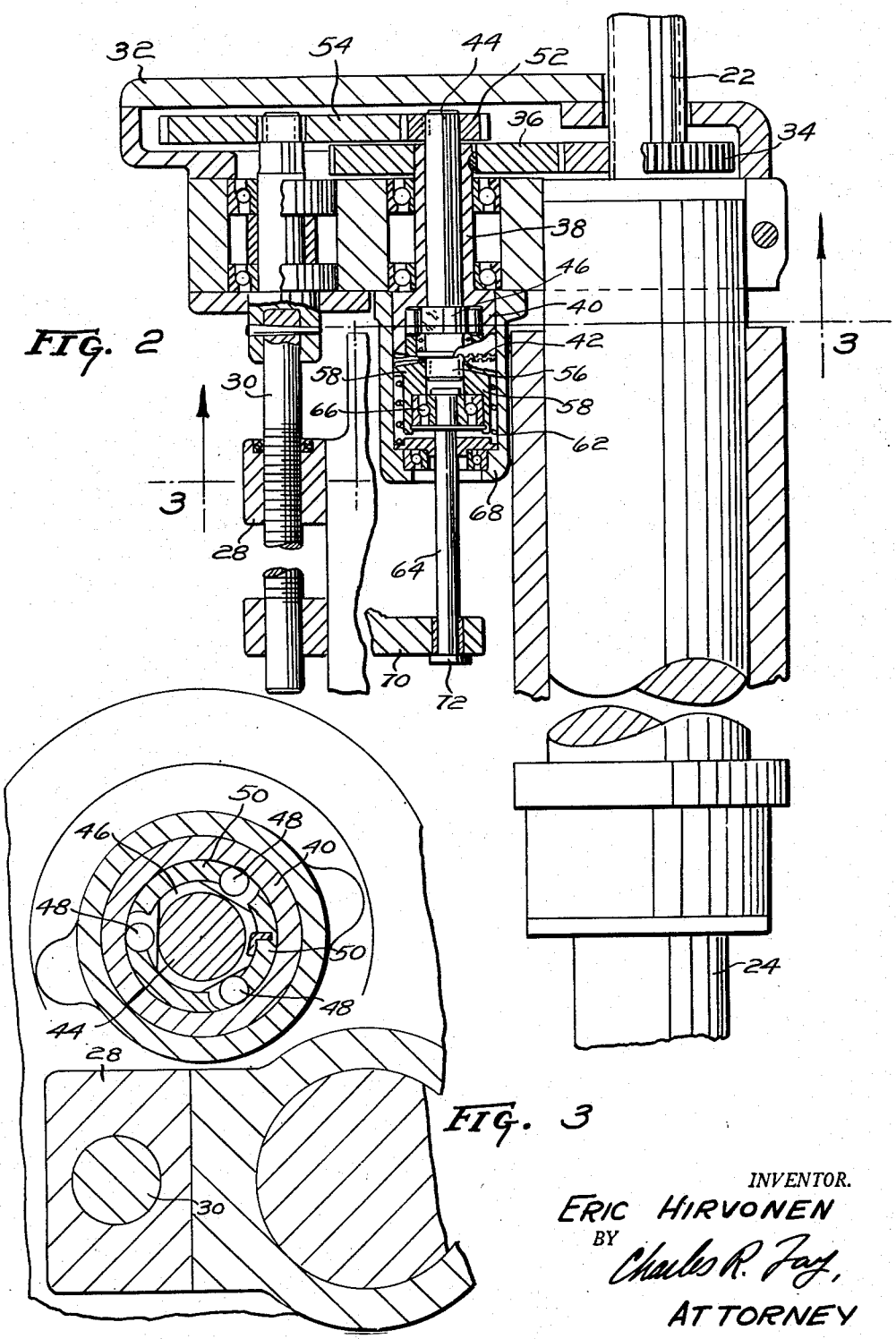

2,711,549

DRIVING MEANS FOR TAPPING DEVICES AND THE LIKE

Eric J. Hirvonen, Shrewsbury, Mass., assignor to Leland-Gifford Company, Worcester, Mass., a corporation of Massachusetts Application July 12, 1950, Serial No. 173,449

7 Claims. (Cl. 10—139)

This invention relates to new and improved driving and clutching means for tapping devices and the like, particularly relating to the feeding of the device to and from the work.

The principal object of the present invention resides in a new and improved clutching device to throw the lead screw into preliminary operation upon initiation of rotation of the main drive shaft, in combination with another clutch which is initiated in its clutching action by the actual operation of the feed screw and travel of the tapping attachment, whereby an initial smooth clutching action takes effect, but before any work is done, a second clutch is thrown into play so as to take the entire thrust imparted to the feed screw drive, and rendering the initial clutching device inoperative.

Another object of the invention resides in the provision of the device as described comprising a main drive shaft to which the tool is adapted to be chucked and having an axial movement derived from a feed screw adapted to rotate in a stationary nut, said drive shaft being geared to a device adapted to rotate an element of a roller clutch device operable to throw the feed screw into rotation immediately upon the initiation of rotation of the drive shaft so that the tapping attachment starts to move in a direction toward the work, and including a tooth faced clutch which is normally open or disengaged when the machine is idle and is provided with means to hold it in such a condition; the tooth clutch faces automatically engaging upon a predetermined movement of the attachment so as to throw the feed screw into direct drive only after initial starting thereof by means of the roller clutch, the latter being ineffective as soon as the tooth faced clutch engages.

Another object of the invention resides in the provision of a device as above described which is smoother in operation particularly as to initiation of the feeding motion and which avoids all shocks or stresses which are ordinarily imparted thereto due to the abrupt shifting from idle to feed conditions.

Other objects and advantages of the invention will appear hereinafter.

Reference is to be had to the accompanying drawings in which

Fig. 2 is an enlarged vertical section through the tapping attachment embodying the present invention;

Fig. 3 is a section on line 3—3 of Fig. 2; and

Figure 1:
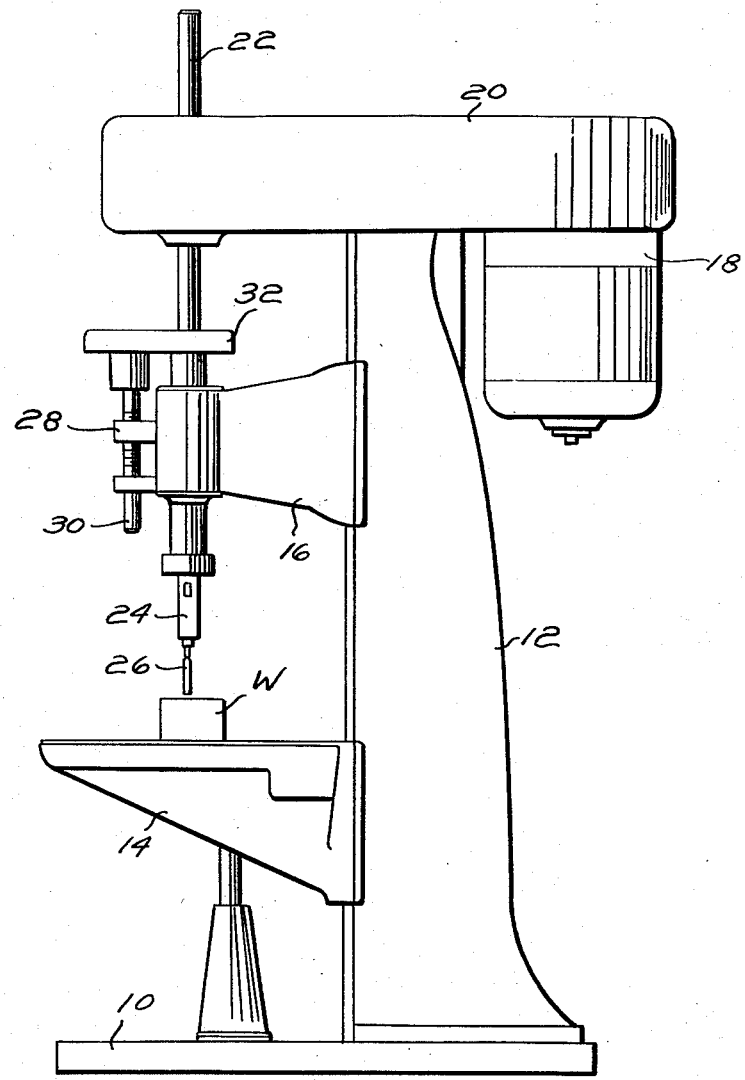
Fig. 1 is a view of a machine which embodies the present invention and illustrating the same in idle condition, i. e., the tool being in a retracted position.
Figure 4:
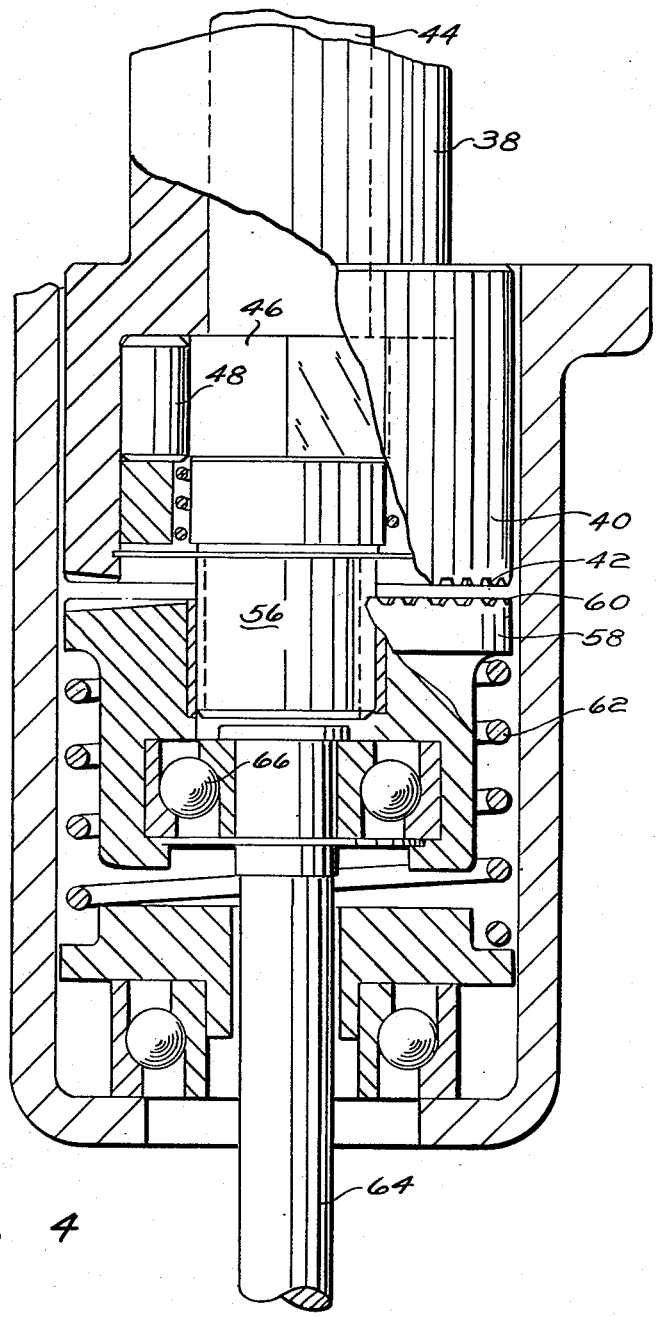
Fig. 4 is an enlarged vertical section through the clutching elements.

In Fig. 1 there is shown a machine having a base 10, a standard 12, a knee or bed 14, a sliding bracket 16 which is provided with means to secure it in vertical adjusted position relative to the knee 14; there is also provided at 18 a motor suspended from a gear casing 20 or the like, the latter containing the usual transmission means to drive the main drive shaft 22. This drive shaft 22 is adapted for rotation to drive a chuck 24 and a tool 26 and it is also capable of axial travel so as to engage the tool 26 with the work W. In this case the device is particularly adapted to tapping, but, of course, the invention is not limited to this operation.

The bracket 16 is provided with a fixed nut 28, there being threaded therein a lead screw 30 which when rotated travels the attachment housing 32 and associated parts including drive shaft 22 and chuck 24 downwardly for the purpose of acting upon the work as described. The motor 18 is a reversible motor and when the tool has reached its lowermost predetermined position and the work stroke is finished, a microswitch or the like is provided for reversing the motor 18 so as to both retract the tool upwardly and rotate it in the opposite direction as, of course, is required for tapping operations. The practice of reversing the drive motor for this purpose is old and well known in the art and need not be further disclosed.

Referring now to Fig. 2 it will be seen that the shaft 22 drives a gear 34 in mesh with a gear 36 keyed to a sleeve 38 having at the lower end thereof an inverted cup-shaped element 40, the latter being provided with clutch teeth at its lower edge as at 42. The sleeve 38 contains a shaft 44 which has at its lower end a substantially flat-sided stud 46 associated with which are a series of rollers 48 and interposed therebetween are arc shaped fingers 50 mounted on cup 40, forming a roller clutch device. When sleeve 38 is rotated the resistance in the gear train, to be later described, to the feed screw 30 requires that the fingers 50 shall force the rollers into engagement with the converging walls of the flat-sided stud 46 and the interior surface of the cup-shaped element 40 thus clutching shaft 44 and causing the same to rotate.

As shaft 44 rotates, it also rotates gears 52, 54, the latter being keyed to the feed screw 30 and causing the same to rotate in the nut 28 whereby the entire attachment starts to descend.

This roller clutch arrangement ensures a smooth initiation of rotation of all of the parts in the train including the shaft 44, gears 52, 54, and feed screw 30. There is a small lost motion effect in the roller clutch whereby the feed screw is started to rotate smoothly rather than with a shock or jerk as would otherwise be the case.

The shaft 44 terminates in a stud 56 which is slidably keyed to a clutch element 58 having teeth 60 complementary to those at 42 on the inverted cup 40 so that the clutch element 58 is enabled to slide up and down relative to the stud 56 but it is non-rotatably engaged therewith. As soon as shaft 44 rotates, clutch element 58 also rotates, but since the teeth 42, 60 are not engaged initially as will be later described, the clutch element 58 is actually being driven through the roller clutch.

The clutch element 58 is spring pressed upwardly toward engagement with the element 40 by means of a spring 62 and ordinarily, therefore, the element 40 and 58 will be engaged so that the roller clutch is of no effect and the sleeve 38 would drive shaft 44 directly without the intermediary of the roller clutch. However, a rod 64 provided with a ball bearing 66 is rotatably associated with clutch element 58 in such a way as to cause it to move relative to the housing 68 and the cup-shaped clutch element 40. The rod 64 is controlled in this respect by a bracket 70 which is fixed. Hence when rod 64 reaches its uppermost position, it is stopped from continuing to rise on the retraction of the attachment by reason of a head 72 contacting bracket 70, and thereby retracts element 58 relative to the remainder of the device so as to disengage clutch teeth 42 and 60.

Assuming the attachment to be in its uppermost position and idle, the motor is started as by throwing a conventional switch. Shaft 22 and sleeve 38 rotate, actuating the roller clutch and thereby initiating rotation of feed screw 30 which causes the attachment to start to descend. This means, of course, that the housing part 68 starts to descend relieving pressure on the spring 62 and allowing it in effect to move clutch element 58 up into engagement with the teeth of element 40, thus throwing in the direct drive for the feed screw and causing the roller clutch to become ineffective. When the motor is reversed for the retraction of the tool, the reverse action takes place and adjacent the end of the upward travel the head 72 strikes bracket 70 while the attachment is still rising causing the clutch elements to disengage. At this point a limit switch is ordinarily used to stop the motor. The reversing switch and limit switch devices are illustrated in co-pending application Serial No. 75,351, filed February 9, 1949.

Having thus described my invention and the advantages thereof, I do not wish to be limited to the details herein disclosed otherwise than as set forth in the claims, but what I claim is:

1. Feed attachment for machine tools or the like comprising a source of power, a drive shaft driven thereby, a tool chuck driven by the drive shaft, means to feed the attachment and tool chuck toward the work, and a clutch device between said means and the drive shaft, said clutch device comprising first a slip clutch operated by rotary motion of the drive shaft and causing the feed attachment to start its travel and second a positive drive clutch operated by the feeding motion of the attachment to subsequently engage and drive the feed means in the same direction regardless of the engagement of the slip clutch, and means to disengage the positive drive clutch upon retraction of the chuck.

2. The feed attachment of claim 1 wherein the slip clutch includes lost motion means imparting a smooth action thereto to avoid shock.

3. The feed attachment of claim 1 wherein the slip clutch includes a roller clutch device for smooth actuation and the positive drive clutch comprises a pair of interengageable clutch-faced members.

4. Feeding attachment for a tool comprising a drive shaft, a clutch element driven thereby, a friction type clutch element engaged thereby upon rotation of the drive shaft, a feed screw, a shaft to rotate the feed screw from the friction type clutch element, a toothed clutch element non-rotatively secured to the shaft, means rendering the toothed clutch element disengaged from the first named clutch element, and means to engage the clutch elements upon initiation of movement of the feed attachment under influence of the feed screw, the first named clutch element being toothed for engagement with the said toothed clutch element.

5. A clutch for driving a feed attachment comprising a main drive shaft, a clutch element rotated thereby, said clutch element having a friction type clutch face and a toothed clutch face, a friction type clutch element for engagement with the friction clutch face upon initiation of rotation of the drive shaft, a toothed clutch element, a feed screw, a shaft to rotate the feed screw, a fixed nut for the latter, both the friction clutch element and the toothed clutch element being non-rotatively associated with said shaft, and means causing engagement of the toothed clutch element with said clutch toothed face upon initiation of the travel of the attachment under influence of the friction type clutch.

6. The clutch of claim 5 wherein the friction clutch includes roller clutch mechanism.

7. A device of the class described comprising a rotary and axially movable shaft for actuation of a tool, a rotary clutch element driven by the shaft, said clutch element having a toothed face and a roller clutch engaging surface, a second shaft, flats thereon, rollers on the flats and cooperatively associated with the roller clutch engaging surface to drive the second shaft merely upon rotation of the first shaft, a feed screw driven by the second shaft, a fixed nut for the screw, the feed screw being operative to move the entire device, a toothed clutch element splined to the second shaft to drive the latter when the toothed clutch element is engaged with the toothed face of the first named clutch element, means to engage the same at all times except when the axially movable shaft is retracted, means to render said engaging means inoperative upon retraction of the axially movable shaft, and means to cause said last named means to operate at the end of the travel of the device so that at rest the toothed clutch elements are held disengaged and upon initial rotation of the first named shaft, the roller clutch only engages until a certain predetermined movement of the device.

References Cited in the file of this patent

UNITED STATES PATENTS

| Number | Name | Date |
|---|---|---|
| 699,613 | Burns | May 6, 1902 |
| 884,529 | Seib | Apr. 14, 1908 |
| 1,480,495 | Bessler | Jan. 8, 1924 |
| 1,818,393 | Hansen | Aug. 11, 1931 |
| 1,893,413 | Hirsh et al. | Jan. 3, 1933 |
| 1,904,621 | Kounovsky | Apr. 18, 1933 |
| 1,945,053 | Lundin et al. | Jan. 30, 1934 |
| 2,368,359 | Hellstrom | Jan. 30, 1945 |
| 2,380,387 | Allen | July 31, 1945 |